United States Patent [19]

Bourassa et al.

[11] 4,227,671
[45] Oct. 14, 1980

[54] VEHICLE REAR VIEW MIRROR MOUNTING

[75] Inventors: Joseph R. Bourassa, Huntington; Manuel Lopez, Trumbull, both of Conn.

[73] Assignee: Parker-Hannifin Corporation, Shelton, Conn.

[21] Appl. No.: 924,341

[22] Filed: Jul. 13, 1978

Related U.S. Application Data

[62] Division of Ser. No. 516,759, Oct. 21, 1974, Pat. No. 4,120,476.

[51] Int. Cl.² .............................................. B60R 1/06
[52] U.S. Cl. .................................................... 248/480
[58] Field of Search ............... 248/274, 276, 278, 279, 248/284, 291, 480, 481, 482, 483, 484, 485, 486, 475 R, 476, 479

[56] References Cited

U.S. PATENT DOCUMENTS

| | | | |
|---|---|---|---|
| 1,991,363 | 2/1935 | La Hodny et al. | 248/482 |
| 2,458,117 | 1/1949 | Tolbert | 248/279 |
| 2,552,074 | 5/1951 | Thompson | 248/480 |
| 2,671,630 | 3/1954 | Whitehead | 248/482 |
| 2,807,985 | 10/1957 | Beach | 248/279 X |
| 2,860,546 | 11/1958 | Bolser | 248/279 X |
| 2,985,414 | 5/1961 | Ince | 248/284 X |
| 3,005,614 | 10/1961 | Daniell | 248/484 X |
| 3,424,517 | 1/1969 | Budreck | 248/484 X |
| 3,667,718 | 6/1972 | Goslin et al. | 248/278 X |

*Primary Examiner*—William H. Schultz
*Attorney, Agent, or Firm*—Albert C. Johnston

[57] ABSTRACT

A rear view mirror mounting for installation on the driver's door of a truck or a car hauling a camper, trailer or the like comprises a rigid arm to protrude from the vehicle door, a mirror support post telescoped with the arm for holding a mirror at the required outward position, two rigid legs diverging downwardly from a pivotal connection with the outer end of the arm, and footing brackets pivoted on parallel horizontal axes to the inner arm end and the lower leg ends so that the assembly can be mounted readily in a desired viewing position on a vehicle door having any of various outside contours. Special two-part footing brackets that comprise heads slidable into locked positions on unobtrusive rail plates fixed to the door enable the mirror assembly to be attached and removed easily.

5 Claims, 11 Drawing Figures

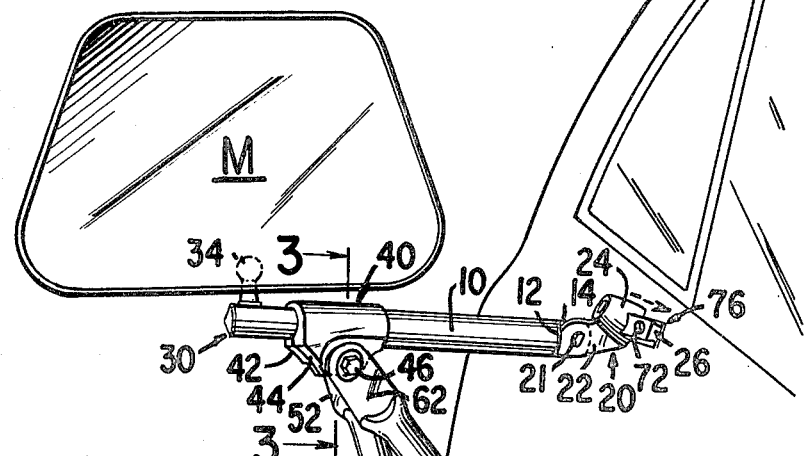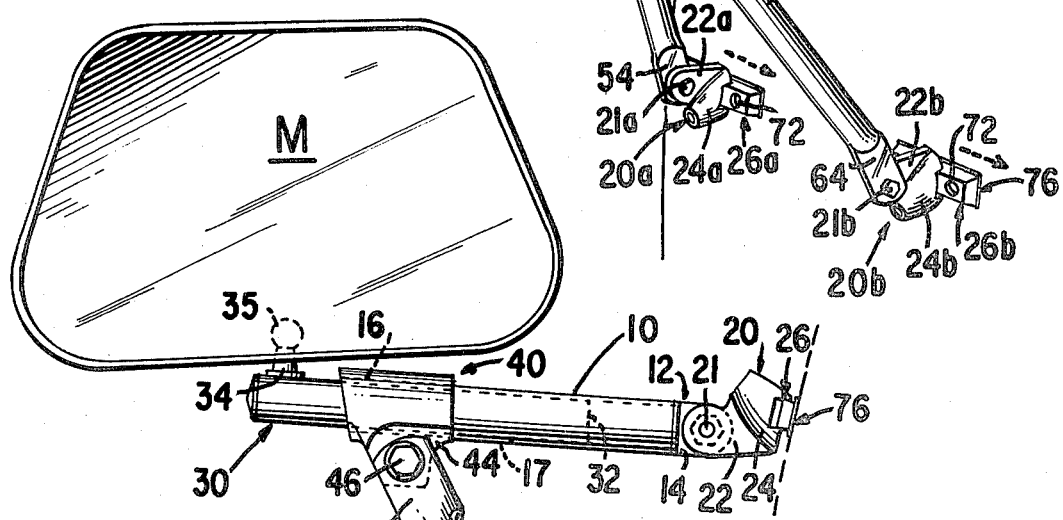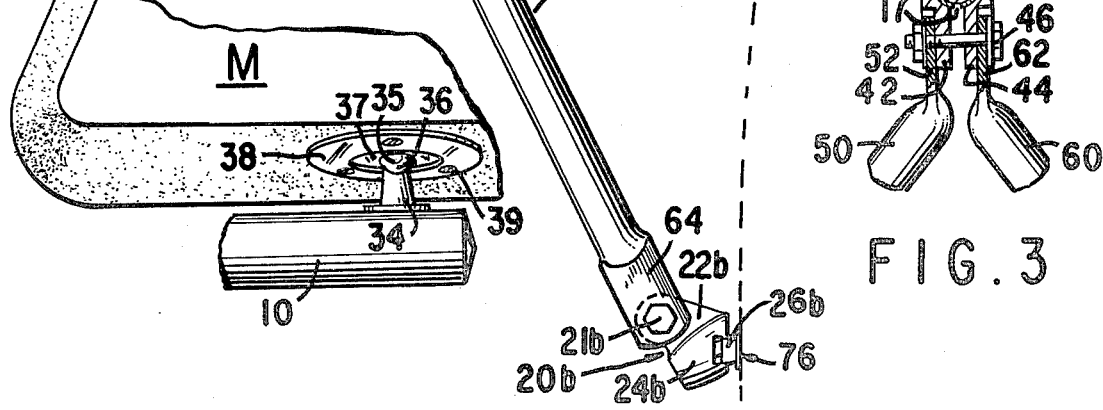

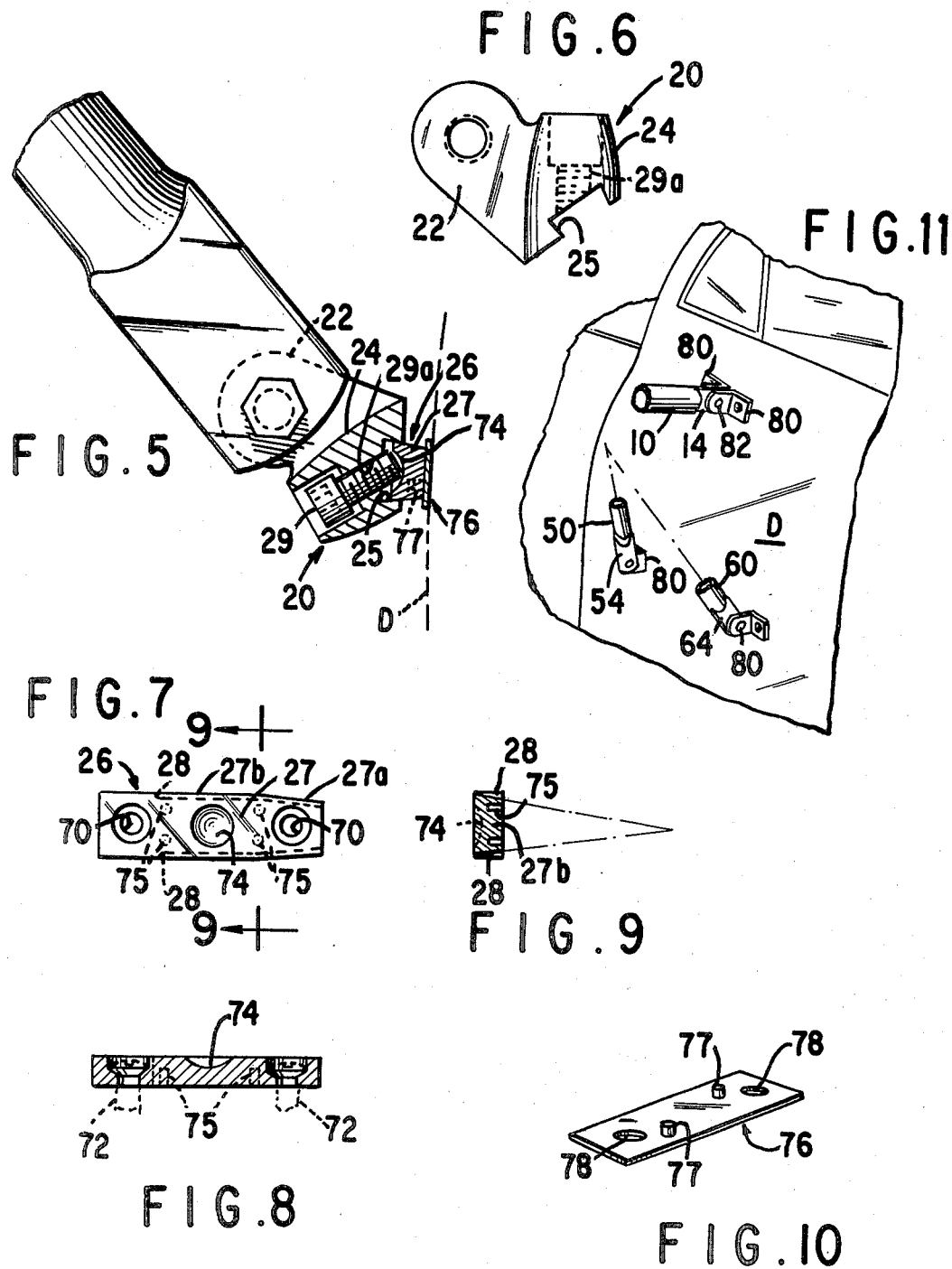

VEHICLE REAR VIEW MIRROR MOUNTING

This is a division of application Ser. No. 516,759 filed Oct. 21, 1974, now U.S. Pat. No. 4,120,476.

This invention relates to a rear view mirror mounting device for installation on the driver's door of a vehicle, such as a pick-up truck or a car hauling a camper, trailer or the like, to position a mirror at a desired outward location so that the driver will have a wide angled mirror view reaching behind the vehicle assembly.

Rear view mirror mounting devices designed to position a mirror outboard for such a view are known, for instance, as shown in U.S. Pat. Nos. 3,259,349 and 3,501,122. In those devices a tripod structure supporting the mirror has on the ends of its legs special brackets and a hook enabling it to be fastened in place by clamping a front fender of the vehicle between its leg ends—the hook being engaged with a wheel well edge of the fender and the brackets being engaged over the fender beneath an edge of the motor hood.

Another known mounting device for a similar purpose, as shown in U.S. Pat. No. 3,667,718, has four legs fastened at their ends to the driver's door of the vehicle and converging outwardly to an apex where they support an upright arm of an L-shaped mirror support for pivotal movement of the latter about a vertical axis.

The principal object of the present invention is to provide a mirror mounting device for the purpose first above mentioned which is suitable for being installed securely by ordinary users on a vehicle door having any of various outside contours.

Another object is to provide such a device whereby the desired outward location of the mirror is readily selectible yet, when once determined for a given camper, trailer or other backward extension of the vehicle, is fixed securely so that the mirror will not vary in outward location.

A further object of the invention is to provide such a device whereby, once it has been installed on a vehicle door, the principal mirror supporting structures protruding from the door are easily removable therefrom and re-fastenable thereto by a user, and whereby only unobtrusive footing elements remain on the door when those structures are removed.

The rear view mirror mounting device of this invention includes a rigid arm, preferably a straight rigid tube, adapted to protrude substantially horizontally outward from a vehicle door with a mirror support held by an outer end portion of the arm. The mirror support preferably comprises a rigid post telescoped into an outer end portion of the arm. Two rigid legs are connected pivotably at their upper ends with the outer end of the arm, from which they diverge each away from the other in downward direction, and footing brackets are connected pivotably, respectively, with the inner end of the arm and the lower ends of the legs on pivot axes which are substantially parallel and normally are substantially horizontal.

As a result of this organization of the structures, once the footing bracket of the horizontal arm is fixed to the vehicle door in a proper location below and ahead of a driver's eyes, the two other footing brackets can readily be fixed to the door, without limitation to any particular outer door contour, so as to hold a mirror on the mirror support in the desired outboard location. The distance of that location from the door may then be adjusted, if required, by adjustment of the position of the mirror support relative to the arm.

According to another important feature of the invention, each of the footing brackets of the mounting device is a two-part bracket comprising a head member pivoted to the respective arm end or leg end and a mating plate member adapted to be fixed to the vehicle door at one of the three fastening locations. One of these members comprises a horizontally elongate rail portion, and the other has a horizontally elongate channel therein to receive slidably and retain the rail portion, and a fastening means on the head member holds it against displacement relative to the plate member when the parts are inter-engaged.

By virtue of this latter feature, when the fastening means on the several head members are released the entire mirror mounting device except the plate members may be removed from the vehicle door simply by thrusting it laterally in one direction so as to slide the head members off the plate members. The device similarly may be re-installed for use by re-engaging the head members with the plate members and re-engaging the fastening means. When it is so removed, only the plate members remain on the door, and they can be so small and unobtrusive that their presence involves no hazard and no significant detriment to the appearance of the door.

The foregoing and other objects, features and advantages of the invention will be further apparent from the following detailed description and the accompanying drawings of illustrative embodiments thereof. In the drawings:

FIG. 1 is a perspective view of a mirror mounting device embodying the invention as installed for use on a vehicle door;

FIG. 2 is a side elevational view thereof;

FIG. 3 is a cross sectional view of coupling structures, taken at line 3—3 of FIG. 1;

FIG. 4 is a fragmentary elevational view of a swivel connection of the mirror head with the mirror support of the device;

FIG. 5 is a fragmentary side elevational view of the lower end of one of the legs of the device of FIG. 1, with the footing bracket thereon shown in medial cross section;

FIG. 6 is a side elevational view of the head member of one of the footing brackets of FIG. 1;

FIG. 7 is a plan view of the plate member thereof;

FIG. 8 is a longitudinal cross sectional view thereof;

FIG. 9 is a cross sectional view thereof taken at line 9—9 of FIG. 7;

FIG. 10 is a perspective view of a base plate thereof; and

FIG. 11 is a perspective view of an embodiment of the invention utilizing footing brackets suitable for permanent installation of the mirror mounting on a vehicle door.

As seen in FIG. 1 and FIG. 2, the mirror mounting provided according to the invention includes a rigid arm 10 protruding substantially horizontally outward from a footing bracket 20 by which it is fastened to a vehicle door D, with a mirror support 30 fitted into the outer end of arm 10 and coupled thereto, as by a clevis 40, so as to hold a rear view mirror M, which is fixed to support 30 as through an upright post 34, in a desired outward location where a driver of the vehicle seated at door D can obtain a good view reaching behind a camper, trailer, truck body, or other relatively wide component assembled with or to be hauled by the vehicle. Two legs 50 and 60 have their respective upper ends secured pivotably to the clevis 40, from which these legs diverge in downward direction to locations where their respective lower ends are fastened to the door D through footing brackets 20A and 20B, respectively. These footing brackets may have the same construction as the bracket 20 on arm 10, though with an opposite oreintation of their respective head members.

The arm 10 constitutes the upper branch of a tripod supporting structure for the mirror M. It preferably is a straight rigid tube made of a corrosion resistant material such as cadmium or chromium plated steel, stainless steel, or aluminum. An end plug 12 fitted into the inner end of arm 10 presents an ear 14 for pivotable connection with a mating ear 22 on a head member 24 of the footing bracket 20. An outer end portion 16 of the arm tube 10 is made resiliently compressible, as by being formed with a slit 17 extending longitudinally from its outer end, and the clevis 40 is fixed about this compressible end portion and provided with end lugs 42 and 44 through which a bolt 46 extends so that the clevis can be contracted by the bolt for secure, tight clamping of the mirror support 30 in a desired position relative to the arm 10.

The mirror support 30 is constituted by a cylindrical post having its inner end portion 32 telescoped into the arm tube 10. The outer end of support post 30 has the upright post 34 fixed into it immovably. The upright post 34 is formed with a spherical upper end 35 which is received in a socket 36 provided in the base of the head of mirror M and is held tightly therein by a friction ring 37 and a clamping ring 38 secured in place by screws 39. The mirror M thus can be turned to a desired angle and tilt relative to the posts 30, 34 and held in the given position by the friction ring 37, and clamping ring 38.

Each of the legs 50 and 60 is a rigid, generally tubular member formed at its upper end with an ear 52 or 62 pivotably connected with the clevis 40 and formed at its lower end with an ear 54 or 64 pivotably connected with a mating ear 22A or 22B of the respective footing bracket 20A or 20B. Bolts 21, 21A and 21B pivotably connect the respective ears 14, 54 and 64 with the mating ears of the head members 24, 24A and 24B of the footing brackets. The upper ends of the legs are fitted on the clevis bolt 46 beneath washers at the outer sides of the clevis lugs 42 and 44, respectively.

The axes of the pivotal movements of the parts about the bolts 46, 21, 21A and 21B are mutually parallel and normally are substantially horizontal. Accordingly, these bolts being suitably loose, when the arm 10 is held horizontal at a desired location relative to the vehicle door D and is fixed in place by fastening its footing bracket 20 flush upon the door surface and tightening its bolt 21, the legs 50 and 60 may then be swung up to locations in which their respective footing brackets 20A and 20B will bear flush against lower portions of the door surface, whatever may be its outer contour. The bolts 21A and 21B may then be tightened and the plate members 26, 26A and 26B fastened to the vehicle with screws 72, whereupon the mirror support 30 may be adjusted to the desired viewing position outwardly of door D and the bolt 46 tightened to hold the mirror M securely in that position.

Each of the footing brackets 20, 20A and 20B is a two-part structure that comprise a plate member, such as the one shown at 26, which is adapted to be fixed to the door D at one of the three fastening locations and which mates with a head member, such as member 24 shown in FIG. 1, that is pivotably connected to the respective ear 14 or leg 54 or 64 as above described. One of these members, preferably the plate member, comprises a horizontally elongated rail portion 27. The other of them, i.e., head member, has a horizontally elongate channel 25 formed therein to receive slidably and retain the rail portion 27. The channel 25, as shown more particularly in FIGS. 5 and 6, has a dove-tailed cross sectional shape and extends across the entire width of the head member. The rail portion 27 has a mating dove-tailed shaped extending from an entry end portion 27A as indicated in FIG. 7 to a wider mid-portion 27B that fits inside channel 25 as shown in FIG. 5 and terminates at abutments 28 near the left hand end of the plate member as viewed in FIGS. 7 and 9.

Each plate member 26 is provided with openings 70 therethrough to receive fastening screws 72, also with a central recess 74 in its upper surface, and with pin sockets 75 bored into its under side. A thin base plate 76 of each plate member has pins 77 thereon to fit into some of the sockets 75, and has holes 78 to align with the openings 70.

The rail portions 27 of the three plate members are oriented in the same direction and engaged slidably in the channels 25 of the three head members. Each head member is then positioned centrally of the engaged plate member and is interlocked with it by turning a set screw 29, which is held in a threaded bore 29A that opens into channel 25, until the end of this screw is seated tightly in the recess 74 of rail portion 27, as indicated in FIG. 5. When the proper location for fastening each footing bracket on the vehicle door has been determined, the base plate 76 of the corresponding rail portion 27 is assembled to the latter by inserting its pins 77 into appropriate sockets 75, whereupon the plate member assembly is fastened in place by screws 72 driven through its openings 70 and 78.

Once the plate members 26 of the footing brackets have been fastened to the vehicle door at the respective locations suited for proper positioning of the mirror M relative to a driver's eyes, the entire mirror supporting structure, except the three plate members, can easily be removed from the door D so as to free the door from outward obstruction when use of the outboard mirror is not required. The set screws 29 are simply turned so as to remove them from the recess 74, whereupon the mirror supporting structure can be slid off the plate members by pushing it as a unit in the direction of the broken-line arrows of FIG. 1. The reverse sliding movement of the head members onto the plate members, followed by re-fastening of the set screws 29, is all that is required for restoring the mirror supporting structure to its installed position for further use. When it is removed, only the unobtrusive plate members 26, 26A and 26B remain on the vehicle door.

It will be understood that the basic features of the invention may be utilized in various forms of structures, without limitation to the particular forms of the parts shown in FIGS. 1–10. For instance, use can be made of various forms of footing brackets pivotably connected to the arm end and leg ends.

For vehicles on which the outboard mirror will continue to serve driving needs so that easy removability and replacement is not desired, the footing brackets may be constituted, for example, by simple angle-iron straps 80 as indicated in FIG. 11. Each of these straps has a leg fastened to the vehicle door and a leg pivotably connected, as by a bolt 82, to an ear 14, 54 or 64 of arm 10, leg 50 or leg 60. When such straps 80 are used, two of them preferably are employed for the arm 10 to give it the desired stability by straddling its pivotal ear 14.

We claim:

1. A vehicle door rear view mirror mounting comprising an arm adapted to protrude substantially horizontally from a vehicle door, a mirror support held by an outer end portion of said arm, two legs diverging each from the other in downward direction, means connecting the respective upper ends of said legs pivotally with and in a fixed location on the outer end of said arm, and footing brackets connected pivotably, respectively, with the inner end of said arm and the lower ends of said legs and adapted to be fastened at three spaced apart locations on the vehicle door, said legs each being pivotable independently of the other relative to said arm about a substantially horizontal axis at said connecting means so that, with said arm protruding substantially horizontally at a desired level from a vehicle door having any of various outside contours, said legs may be swung to positions suited for fastening the said brackets thereon onto the vehicle door, the axes of the respective pivotable connections of said legs with said arm and of said brackets with said arm and said legs being substantially parallel and normally being substantially horizontal, said inner end of said arm and said lower ends of said legs each comprising an ear having at least one side thereof flattened in a substantially vertical plane, each of said footing brackets comprising a rigid angled strap having a substantially flat upstanding portion fixed pivotably to a said flattened ear side and having a substantially flat foot portion protruding substantially horizontally and laterally to one side of the respective arm or leg for fastening the latter to said door, whereby a mirror on said support may be mounted readily in a desired viewing position on a vehicle door having any of various outside contours.

2. A mirror mounting according to claim 1, said arm including a straight rigid tube having a resiliently compressible outer end portion, said mirror support comprising a post telescoped into said tube through said end portion, said connecting means comprising a clevis fixed about said end portion and having end lugs contractable by a bolt so that said support may be slid to a desired distance from the vehicle door when said bolt is loose but will be clamped in place by tightening of said bolt.

3. A mirror mounting according to claim 1, said upper ends of said legs fitting pivotably onto said bolt outside said clevis lugs so that said legs each may be pivoted relative to said arm when said bolt is loose but will be clamped tight when said bolt is tight.

4. A mirror mounting according to claim 1, said ear of said arm end having its opposite sides flattened in substantially parallel planes and having a said upstanding portion of a said rigid angled strap fixed pivotable to each of said sides with the respective foot portions of the arm ear straps protruding laterally to opposite sides of said arm.

5. A vehicle door rear view mirror mounting comprising an arm including a rigid cylindrical tube adapted to protrude substantially horizontally from a vehicle door, an outer end portion of said tube being slit longitudinally so as to be resiliently compressible, a mirror support comprising a rigid cylindrical post telescoped into said tube through said end portion and slidable relative thereto so that a mirror on said support may be set at a desired distance from said door, a clevis fixed about said end portion and having end lugs contractable together by a bolt for compressing said end portion so as to clamp said post in place, two rigid legs diverging each from the other in downward direction and having their respective upper ends fitted onto said bolt outside said clevis lugs so that said legs each may be pivoted relative to said arm about the axis of said bolt when said bolt is loose but will be clamped tight when said bolt is tight, and footing brackets connected, respectively, with the inner end of said arm and the lower ends of said legs for independent pivotal movement relative thereto about substantially parallel, normally horizontal axes substantially parallel to the axis of said bolt, said legs being independently pivotable about said bolt axis so that, with said arm protruding substantially horizontally at a desired level from a vehicle door having any of various outside contours, said legs may be swung to positions suited for fastening the footing brackets thereon onto the vehicle door at spaced apart locations on said door so as to mount a mirror held on said mirror support in a desired viewing position irrespective of the outside contour of the door, said inner end of said arm and said lower ends of said legs each comprising an ear having at least one side thereof flattened in a substantially vertical plane, each of said footing brackets comprising a rigid angled strap having a substantially flat upstanding portion fixed pivotably to a said flattened ear side and having a substantially flat foot portion protruding substantially horizontally and laterally to one side of the respective arm or leg for fastening the latter to said door.

* * * * *